UNITED STATES PATENT OFFICE.

ALCIDE FRANCOIS POIRRIER, OF PARIS, FRANCE.

PROCESS OF MAKING SULFUR DYES.

SPECIFICATION forming part of Letters Patent No. 648,597, dated May 1, 1900.

Application filed May 16, 1899. Serial No. 717,037. (No specimens.)

*To all whom it may concern:*

Be it known that I, ALCIDE FRANCOIS POIRRIER, of Paris, in the Republic of France, have invented a new and useful Improvement in the Manufacture of New Substantive Black Coloring-Matters, of which the following specification is a full, clear, and exact description.

Sulfureted coloring-matters have been produced by causing sulfur or sulfur and sodium sulfid to react on hydroxylated, amido hydroxylated, polyamido, amidoacetylated, and aromatic compounds. I have since found that the application of this reaction to mixtures of aromatic compounds of different nature leads to unexpected results essentially different from those obtained by treating the compounds separately. Thus if mixtures, for instance, of paramidophenol and alpha-naphthol, or of paramidophenol and orthonaphthol, or of paramidophenol and orthophenylenediamin, or of paramidophenol and triamidobenzene are treated the coloring-matters obtained are different in tint and in chemical properties from the coloring-matters obtained from paramidophenol, or alpha-naphthol, or orthophenylenediamin, or triamidobenzene when any one of these is treated alone. The coloring-matter from paramidophenol is readily soluble in free alkalies or carbonates and dyes cotton black. The coloring-matters from orthophenylenediamin and triamidobenzene are insoluble in alkaline carbonates. The coloring-matters from alpha-naphthol, orthophenylenediamin, and triamidobenzene dye cotton brown-red, while the coloring-matters above referred to are clear black and insoluble or scarcely soluble in alkaline carbonates, but are all soluble in alkali sulfids.

Example I: There are heated to 200° centigrade for three hours in an iron pan one part of paramidophenol, 1.2 parts of alpha-naphthol, and three parts of sulfur. The whole is allowed to cool and has added to it eight parts of crystallized sodium sulfid. It is then gradually heated up and kept for three to four hours at a temperature of about 180° to 200° centigrade. The brittle black mass thus obtained dissolves in alkalies or alkali sulfids. It dyes a clearer black than the coloring-matter derived from paramidophenol treated by itself, and, as is known, alpha-naphthol gives a weak brown coloring-matter. In this example nitroso-alpha-naphthols and their reduction products can be substituted for the alpha-naphthol.

Example II: Into 2.5 parts of sulfur fused and heated to about 160° centigrade are introduced one part of paramidophenol and 1.15 parts of orthonitranilin. The mixture is heated for two hours to 180° to 200° centigrade. There are then added eight to ten parts of crystallized sodium sulfid, and the heat is kept for three to four hours at 180° to 210° centigrade. The product, which is scarcely at all soluble in alkaline carbonates, gives a black dye more clear than the product obtained by treating paramidophenol alone.

For the orthonitranilin may be substituted orthophenylenediamin, and the position of the substitutions may be inverted. Thus in one of the aromatic nuclei of the substances treated the two substitutions of amin and phenol into para in one of them and amin alone into ortho in the other might be amin and phenol into ortho in the one and amin into para in the other—that is to say, paraphenyldiamin may be substituted for paramidophenol and orthoamidophenol for orthophenylenediamin.

Example III: One part of paramidophenol and one part of triamidobenzene-1:3:4 (or a corresponding quantity of one of its salts set free by soda) are heated with two parts of sulfur, the temperature being raised to 200° centigrade and kept up for two to three hours. Eight parts of crystallized sodium sulfid are then made to act on the above, the temperature being maintained for three to four hours from 190° to 220° centigrade. The coloring-matter thus obtained is insoluble in alkaline carbonates and dyes cotton black. For the triamidobenzene-1:3:4 may be substituted chrysoidin from anilin, triamidobenzene-1:2:6, dinitranilins-1:2:4 and -1:2:6, or the Bismarck brown from metaphenylenediamin. As in example II, the arrangement of the substitution may also be inverted. For paramidophenol may be substituted paraphenylenediamin and for triamidobenzene dinitrophenol or diamidophenol.

In the three examples for the paramidophenol may be substituted any substance capable of producing it in the reaction medium, such as azo derivatives of phenol, paranitrophenol, nitrosophenol, oxyazobenzene, &c. The methods of operating may also be varied. Thus the heating may be first with sulfur and then with sodium sulfid, or with both together. The temperatures may be at first very high or may be gradually raised to 180°, 210°, or 220° centigrade.

All the coloring-matters obtained, as above set forth, may be applied without any further preparation or they may be freed from accessory substances which they contain by washing with acidulated boiling water, and the residue constituting the coloring-matter may be prepared for dyeing by bruising it with sodium sulfid or other solvent.

These coloring-matters all dye cotton clear black in an alkaline bath with or without addition of sodium sulfid. The shades obtained on exposure to the air rapidly become very intense. Contrary to those obtained from paramidophenol, they give without bichromate treatment stable and definite shades having great resistance to alkaline washing.

While reference is made in the following claims to paramidophenol as one of the substances forming part of the mixture of aromatic compounds, its equivalents—such as the azo derivatives of phenol, paranitrophenol, and the like—may be employed with analogous results, and likewise, while reference is made to alpha-naphthol as the other substance forming part of the mixture, its equivalents—orthonitranilin, orthophenylenediamin, and triamidobenzene—may be employed with analogous results.

I claim—

1. The herein-described process of manufacturing substantive coloring-matters consisting in causing sulfur to act on a mixture of paramidophenol and alpha-naphthol.

2. The herein-described process of manufacturing substantive coloring-matters consisting in causing sulfur and sodium sulfid to react on a mixture of paramidophenol with alpha-naphthol.

3. The herein-described coloring-matter formed by causing sulfur to act on a mixture of paramidophenol and alpha-naphthol, said coloring-matter being clear black, insoluble or scarcely soluble in alkaline carbonates, but soluble in alkali sulfids.

4. The herein-described coloring-matter formed by causing sulfur and sodium sulfid to react on a mixture of paramidophenol and alpha-naphthol, said coloring-matter being clear black, insoluble or scarcely soluble in alkaline carbonates, but soluble in alkali sulfids.

In witness whereof I have hereunto signed my name in the presence of two subscribing witnesses.

ALCIDE FRANCOIS POIRRIER.

Witnesses:
JULES ARMENGAUD, Jeune,
J. ALLISON BOWEN.